(12) United States Patent
Goto et al.

(10) Patent No.: US 6,940,673 B2
(45) Date of Patent: Sep. 6, 2005

(54) METHOD AND DEVICE FOR VARYING RESONANT FREQUENCY OF MAGNETIC MEMORY DEVICE

(75) Inventors: Satoshi Goto, Tokyo (JP); Junji Takiguchi, Tokyo (JP); Kiyoshi Tada, Kanagawa (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 10/083,971

(22) Filed: Feb. 25, 2002

(65) Prior Publication Data

US 2002/0118478 A1 Aug. 29, 2002

(30) Foreign Application Priority Data

Feb. 26, 2001 (JP) ..................................... P2001-051107

(51) Int. Cl.[7] ............................................. G11B 5/035
(52) U.S. Cl. ......................................... 360/65; 360/67
(58) Field of Search .............................. 360/65, 46, 66, 360/67

(56) References Cited

U.S. PATENT DOCUMENTS

| | | | | |
|---|---|---|---|---|
| 4,656,533 A | * | 4/1987 | Sakai et al. | 360/65 |
| 5,671,098 A | * | 9/1997 | Mathews et al. | 360/67 |
| 6,249,398 B1 | * | 6/2001 | Fisher et al. | 360/65 |

* cited by examiner

*Primary Examiner*—David Hudspeth
*Assistant Examiner*—Daniell L. Negrón
(74) *Attorney, Agent, or Firm*—Frommer Lawrence & Haug LLP; William S. Frommer; Samuel S. Lee

(57) ABSTRACT

A magnetic reproducing device which includes a signal detecting means for detecting a signal from a magnetic recording medium by a coil, an amplifying means for amplifying the signal detected by the signal detecting means, a filtering means for filtering the signal amplified by the amplifying means, and a capacitor connected in parallel to the coil of the signal detecting means. In this device, the actual resonance frequency of a resonance circuit including the coil, the capacitor and a floating capacitance is set to be four to eight times the maximum reproduced frequency, thereby attenuating the high-frequency high-energy electromagnetic noise inputted to the magnetic reproducing device.

8 Claims, 6 Drawing Sheets

(PRIOR ART)

METHOD AND DEVICE FOR VARYING RESONANT FREQUENCY OF MAGNETIC MEMORY DEVICE

BACKGROUND OF THE INVENTION

The present invention relates to a magnetic reproducing device for detecting a signal from a magnetic recording medium and, more particularly, to a device having an effective function against high-frequency range noise detected by a magnetic head.

With the recent increase of opportunities of using computers equipped with apparatus such as magnetic reproducing devices and so forth, there is developed an advanced contrivance of raising a clock frequency of a CPU (central processing unit) so as to process a greater quantity of information. And it is not unusual now to employ a CPU whose clock frequency is higher than 1 GHz.

Currently, popular computers are of a portable type ready to be carried with facility. In communication via an electric communication line, a portable computer uses a communication terminal such as a PHS (personal handyphone system) or a cellular phone. In any of these communication terminals, there is observed a trend of raising its clock frequency, and intense waves of higher than 1 GHz or so are used at present.

As described, any apparatus such as a magnetic reproducing device provided in a computer is kept exposed to severe environment with high-frequency high-energy electromagnetic noise.

Now a conventional magnetic reproducing device will be explained with reference to FIG. 7.

A magnetic reproducing device 2 comprises a magnetic head 30, a head amplifier 31 and a filter 32. The magnetic head 30 is connected to the head amplifier 31, and detects a magnetic signal from a magnetic recording medium, not shown, through access to a predetermined position of the recording medium. Then the head 30 converts the detected magnetic signal into a voltage value, and supplies the same to the head amplifier 31.

The magnetic head 30 employed here is an inductive head wherein a coil is wound around a magnetic core (of ferrite or the like) having a great magnetic permeability, and an air gap is formed in a portion corresponding to a magnetic face. The magnetic head 30 records information by residual magnetization caused by abrupt changes of a magnetic field when the magnetic recording medium is separated from the air gap. Further the magnetic head 30 reproduces the information by the electromotive force derived from the residual magnetism.

The head amplifier 31 is disposed between the magnetic head 30 and the filter 32. The head amplifier 31 amplifies the voltage value supplied from the magnetic head 30, and then supplies the amplified voltage value to the filter 32. The filter 32 is connected to the head amplifier 31, and has such a characteristic as to attenuate the noise of any frequency higher than the maximum reproduction frequency of the magnetic reproducing device 2. The filter 32 consists of a high pass filter, a low pass filter and a band pass filter. The high pass filter cuts off DC components and low frequencies unrequired for the reproduced signal; the low pass filter cuts off noise of high frequencies; and the band pass filter differentiates the waveform for detecting the peak of the reproduced signal. Lately, in magnetic recording media, the signal level of the magnetic signal is rendered lower for raising the recording density.

The magnetic reproducing device 2 is affected very sharply by the high-frequency high-energy electromagnetic noise. The high-frequency high-energy electromagnetic noise is transmitted via the magnetic head 30 to the signal processing circuit in the following stage. Since it is impossible to completely attenuate the high-frequency high-energy electromagnetic noise by the filter 32, such noise causes deterioration of the SN ratio relative to the internal signal in the magnetic reproducing device 2. As a result, there arises a problem that, in the magnetic reproducing device 2, some error may be generated at the time of detecting the magnetic signal from the magnetic recording medium.

In order to solve the known problem mentioned above, it has been customary heretofore to enclose the magnetic reproducing device 2 with an electromagnetic noise prevention shield.

For example, the electromagnetic noise prevention shield is formed by covering the magnetic reproducing device entirely with copper connected to zero volt, or by using a copper alloy or the like for composition of peripheral component parts around the magnetic head, such as a carriage, a magnetic head arm and a gimbal leaf spring. In another example, an aluminum plate is inserted between the circuit and the magnetic head, or leadwires and the periphery of the head amplifier are shielded with an aluminum plate.

However, the electromagnetic noise prevention shield needs to be composed of copper, aluminum or similar expensive material having a small electric resistance so as to cut off the high-frequency high-energy electromagnetic noise, hence bringing about another problem that the magnetic reproducing device is rendered expensive.

Further, particularly against high-frequency electromagnetic noise, there exist some technical difficulties since the electromagnetic noise prevention shield, is required to cover the whole magnetic reproducing device completely without any break. Moreover, in using a removable disk such as a floppy disk, it is difficult to perfectly cut off the high-frequency high-energy electromagnetic noise because a disk insertion slot is not coverable.

In addition to the above, there is another problem that, due to the use of a metallic material such as copper or aluminum, the electromagnetic noise prevention shield becomes heavier in weight and renders the apparatus inconvenient with regard to the portability thereof.

SUMMARY OF THE INVENTION

The present invention has been accomplished in view of the circumstances mentioned above. And it is an object of the invention to provide an improved magnetic reproducing device which is capable of attenuating the noise in a high-frequency band without impairing the signal band reproduction characteristic.

According to one aspect of the present invention, there is provided a magnetic reproducing device which includes a signal detecting means for detecting a signal from a magnetic recording medium by a coil, an amplifying means for amplifying the signal detected by the signal detecting means, a filtering means for filtering the signal amplified by the amplifying means, and a capacitor connected in parallel to the coil of the signal detecting means, wherein the actual resonance frequency of a resonance circuit including the coil, the capacitor and a floating capacitance is set to be four to eight times the maximum reproduction frequency.

In this magnetic reproducing device, the resonance frequency is lowered due to the capacitor connected in parallel to the coil of the signal detecting means, whereby the noise in a high-frequency band is not transmitted to the following stage.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to the accompanying drawings.

Figure 1:
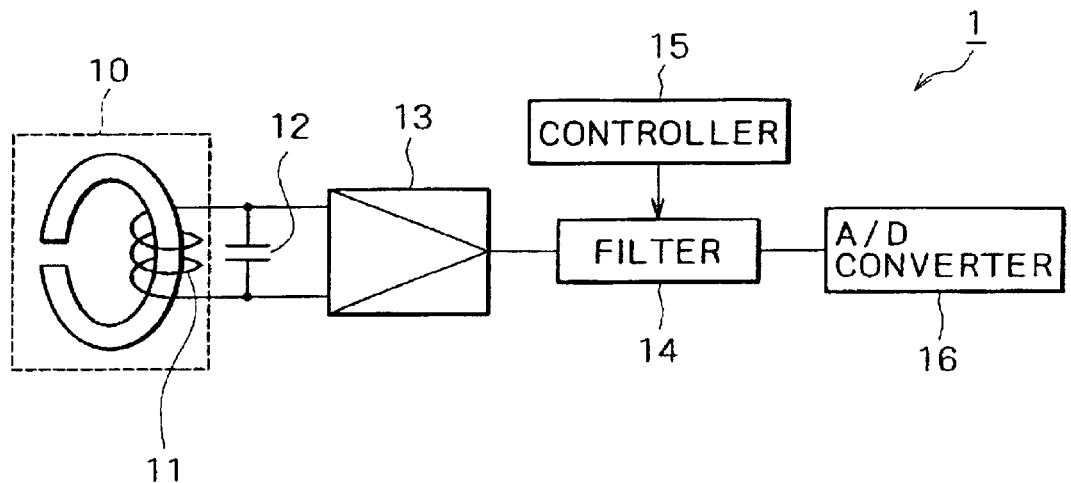
FIG. 1 is a block diagram showing the structure of principal component parts in a magnetic reproducing device where the present invention is applied.

For example, the present invention is applied to such a magnetic reproducing device as shown in FIG. 1.

The magnetic reproducing device 1 comprises a magnetic head 10, a capacitor 12, a head amplifier 13, a filter 14, a controller 15 and an A/D converter 16.

The magnetic head 10 is an inductive one wherein a coil 11 is wound around a magnetic core (of ferrite or the like) having a great magnetic permeability, and an air gap is formed in a portion corresponding to a magnetic face. The magnetic head 10 is so driven as to access a magnetic recording medium, not shown, such as a 3.5-inch micro floppy disk, and detects a signal from a predetermined area of the magnetic recording medium where recorded information is stored. The magnetic head 10 may be a read-only head used exclusively for reproduction, or a write-read head used for both recording and reproduction.

The capacitor 12 is connected in parallel to the coil 11 of the magnetic head 10, and is disposed between the magnetic head 10 and the head amplifier 13. The capacitor 12 constitutes a resonance circuit in combination with the coil 11, and serves to attenuate any high-frequency high-energy electromagnetic noise detected by the magnetic head 10. The head amplifier 13 is disposed between the capacitor 12 and the filter 14. The head amplifier 13 amplifies the signal detected by the magnetic head 10, and then supplies the amplified signal to the filter 14.

The filter 14 is connected to the head amplifier 13 and the A/D converter 16, and its filtering characteristic is switched under control of the amplifier 15. The filter 14 executes a process of filtering the signal supplied thereto from the head amplifier 13. Then the filter 14 supplies the filtered signal to the A/D converter 16.

The controller 15 performs control of switching the filtering characteristic of the filter 14. The controller 15 switches the filtering characteristic of the filter 14 in accordance with the position of the magnetic head 10 on the disk-shaped recording medium.

The A/D converter 16 is connected to the filter 14. The A/D converter 16 converts the analog signal supplied from the filter 14 into a digital signal.

Now an explanation will be given on a 3.5-inch micro floppy disk drive (hereinafter referred to as FDD) which operates at a transfer rate of 500 kbps as the above-described magnetic reproducing device 1. A transfer rate of 500 kbps is a standard prescribed by JIS X6225-1990. In the magnetic reproducing device where the transfer rate is 500 kbps, the maximum reproduction frequency is 250 kHz.

Figure 2:
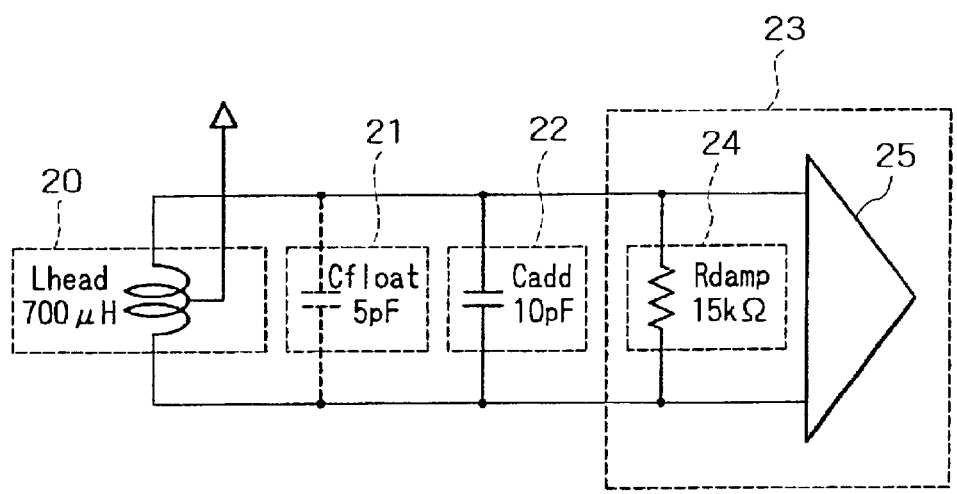
FIG. 2 is a circuit diagram of principal component parts in a 3.5-inch micro floppy disk drive where the present invention is applied.

As shown in a circuit diagram of FIG. 2, the FDD includes a coil 20 of the magnetic head 10, a floating capacitor 21, an additional capacitor 22, and a reproducing amplifier unit 23. The coil 20 of the magnetic head 10 has a center tap, and a 5V power source is connected thereto. The reproducing amplifier unit 23 has a damping resistor 24 and a reproducing amplifier 25. In this embodiment, the coil 20 has an inductance of 700 $\mu$H; the floating capacitor 21 has a capacitance of 5 pF; the additional capacitor 22 has a capacitance of 10 pF; and the damping resistor 24 has a resistance of 15 k$\Omega$.

Figure 3:
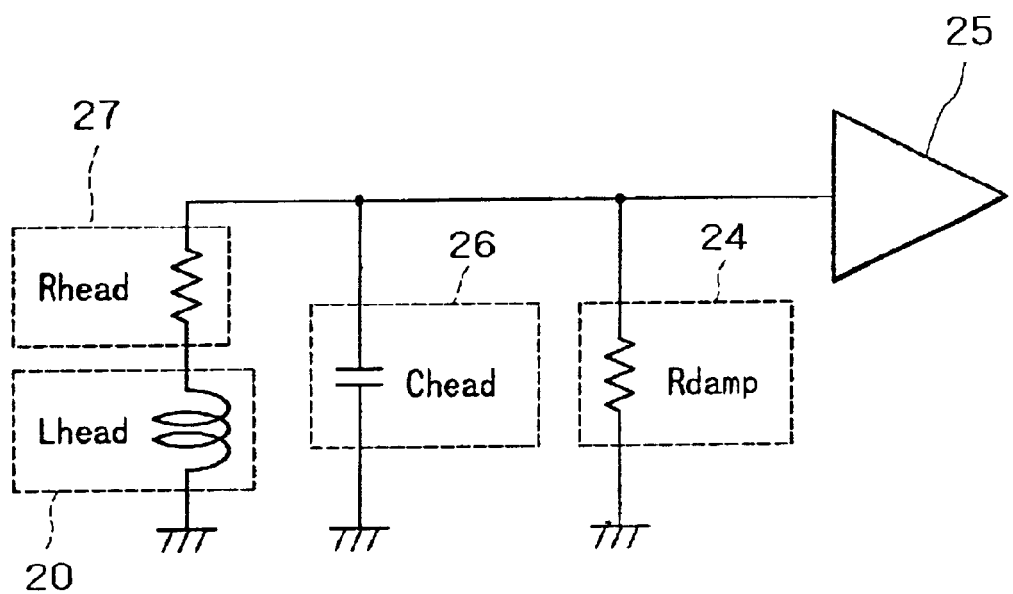
FIG. 3 is an equivalent circuit diagram of FIG. 2 which represents a circuit diagram of principal component parts in a 3.5-inch micro floppy disk drive where the present invention is applied.

FIG. 3 shows an equivalent circuit of the FDD. In this diagram, any component parts corresponding to those in FIG. 2 are denoted by the same reference numerals. A composite capacitor 26 is a combination of the floating capacitor 21 and the additional capacitor 22. A head resistor 27 includes the resistance of a wiring and has a value of 30 $\Omega$.

Figure 4:
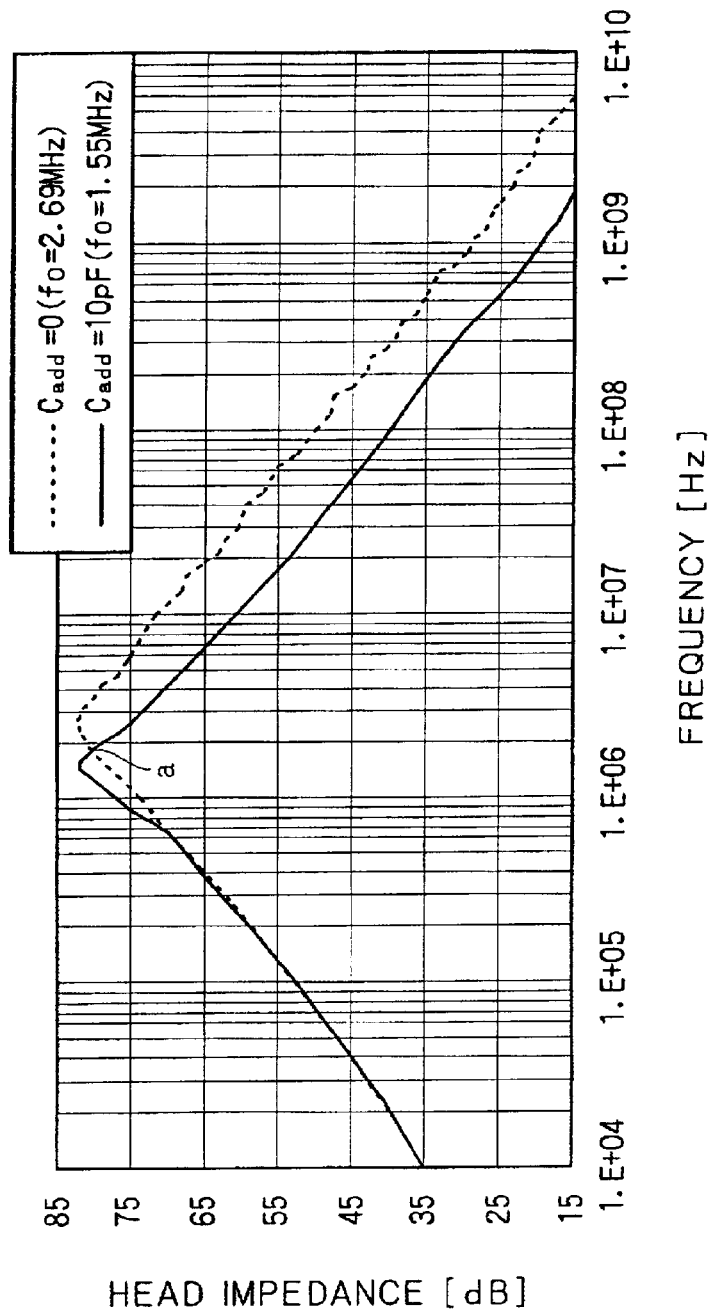
FIG. 4 graphically shows a comparison of the frequency-head impedance characteristics in the magnetic reproducing device of the present invention and a conventional device.

Referring now to FIG. 4, a description will be given on a comparison between the frequency-head impedance characteristic of the FDD with the additional capacitor 22 and that of another FDD without such capacitor. The resonance frequency $f_{01}$ of the FDD without the additional capacitor 22 is 2.69 MHz, while the resonance frequency $f_{02}$ of the FDD with the additional capacitor 22 is 1.55 MHz. The resonance frequency $f_{01}$ is that of a resonance circuit consisting of the floating capacitor 21 and the coil 20. And the resonance frequency $f_{02}$ is that of a resonance circuit consisting of the additional capacitor 22, the floating capacitor 21 and the coil 20. The head impedance here signifies the impedance of the head part as viewed from the head amplifier 13.

In a frequency range from 500 kHz to 2 MHz or so, the noise inputted to the FDD with the additional capacitor 22 is more than the noise inputted to the other FDD without the additional capacitor 22. This phenomenon is derived from the fact that more noise is prone to be picked up as the impedance of the magnetic head 10 becomes higher, and the noise thus picked up is supplied more readily to the head amplifier 13. And in the FDD with the additional capacitor 22, the head impedance in a high frequency range is reduced approximately by 10 dB as compared with the value obtained in the other FDD without the additional capacitor 22.

Figure 5:
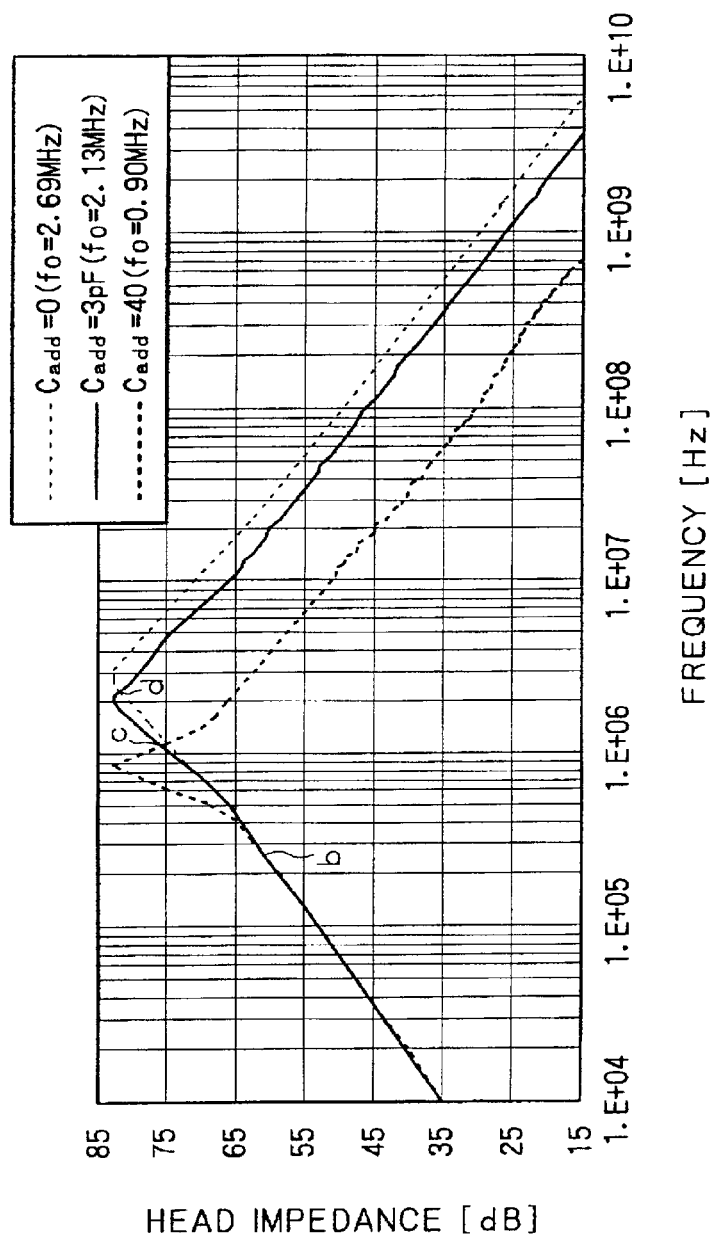
FIG. 5 graphically shows a comparison of the frequency-head impedance characteristics in one case where an additional 40 pF capacitor is provided in the magnetic reproducing device of the present invention, another case where an additional 3 pF capacitor is provided therein, and a further case where any additional capacitor is not provided therein.

Referring next to FIG. 5, a description will be given on the frequency-head impedance characteristics of the FDD obtained in two cases where the additional capacitor 22 has a capacitance of 3 pF and a capacitance of 40 pF. The resonance frequency $f_{03}$ is 0.90 MHz when the additional capacitor 22 of 40 pF is provided in the FDD. And the resonance frequency $f_{04}$ is 2.13 MHz when the additional capacitor 22 of 3 pF is provided in the FDD. The resonance frequency $f_{03}$ is that of a resonance circuit consisting of the 40 pF additional capacitor 22, the floating capacitor 21 and the coil 20. And the resonance frequency $f_{04}$ is that of a resonance circuit consisting of the 3 pF additional capacitor 22, the floating capacitor 21 and the coil 20.

As shown graphically in FIG. 5, the head impedance of the FDD with the 40 pF additional capacitor 22 is reduced, in a frequency range higher than 2 MHz or so, approximately by 20 dB as compared with the value obtained in the other FDD without the additional capacitor 22. Meanwhile, the head impedance of the FDD with the 3 pF additional capacitor 22 is higher, in a frequency range lower than 1 MHz or so, than the value obtained in the other FDD without the additional capacitor 22.

The head impedance of the FDD with the 3 pF additional capacitor 22 is reduced, in a frequency range higher than 2 MHz or so, approximately by 4 dB as compared with the value obtained in the other FDD without the additional capacitor 22. Meanwhile, the head impedance of the FDD with the 3 pF additional capacitor 22 is equal, in a frequency range lower than 1 MHz or so, to the value obtained in the other FDD without the additional capacitor 22.

In the FDD with the 40 pF additional capacitor 22, the head impedance is kept substantially unchanged in a frequency range under point b as compared with the value obtained in the other FDD without the additional capacitor 22, but in a frequency range over point c, the head impedance is lowered approximately by 20 dB to consequently achieve a noise reduction effect. Meanwhile in a frequency range from point b to point c, the head impedance is increased approximately by a maximum of 10 dB, and it is difficult for the filtering means in the following stage to attain wide improvement of the cut-off characteristic. In view of this point, using the 40 pF additional capacitor is not adequate.

In the FDD with the 3 pF additional capacitor 22, the head impedance is kept substantially unchanged in a frequency range under point d as compared with the value obtained in the other FDD without the additional capacitor 22. But in a frequency range over point d, the head impedance is lowered merely by 4 dB or so and therefore a noise reduction effect is little. In view of this point, using the 3 pF additional capacitor 22 is not adequate. In this example, point b corresponds approximately to 250 kHz, point c to 1.2 MHz, and point d to 2.3 MHz, respectively.

In contrast with the above, the FDD with the 10 pF additional capacitor 22 has such characteristic that, in a frequency range under point a, the head impedance is increased approximately by a maximum of 4 dB as compared with the value obtained in the other FDD without the additional capacitor 22, indicating that it is possible for the filtering means in the following stage to achieve improvement of the cut-off characteristic, and therefore a noise-proof function can be ensured with regard to the reproduced signal. In a frequency range over point a, the head impedance is lowered approximately by 10 dB to consequently attain a remarkable noise reduction effect. In this example, point a corresponds approximately to 1.8 MHZ.

It is therefore considered that an adequate capacitance of the additional capacitor 22 is 10 pF or so, and an adequate resonance frequency is in a range of 1 to 2 MHz. The frequency-head impedance characteristic was calculated by substituting each value for the composite impedance Z in Eq. (1) shown below.

$$1/Z = 1/(R_{head} + j\omega L_{head}) + 1/j\omega C_{head} + 1/R_{damp} \quad (1)$$

In the above equation, $R_{head}$ stands for the head resistor 27, $L_{head}$ for the coil 20, $C_{head}$ for the composite capacitor 26, and $R_{damp}$ for the damping resistor 24, respectively.

Figure 6:
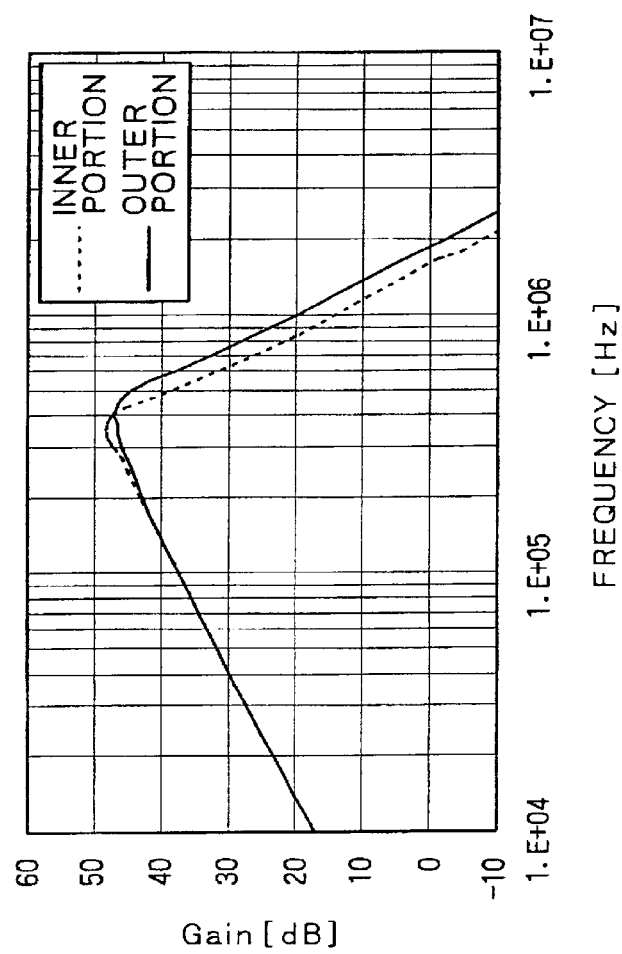
FIG. 6 graphically shows a comparison of the frequency-gain characteristics obtained by switching the filtering characteristic in the vicinity of an innermost portion of a magnetic recording medium and in the vicinity of an outermost portion thereof in the magnetic reproducing device of the present invention.
Figure 7:
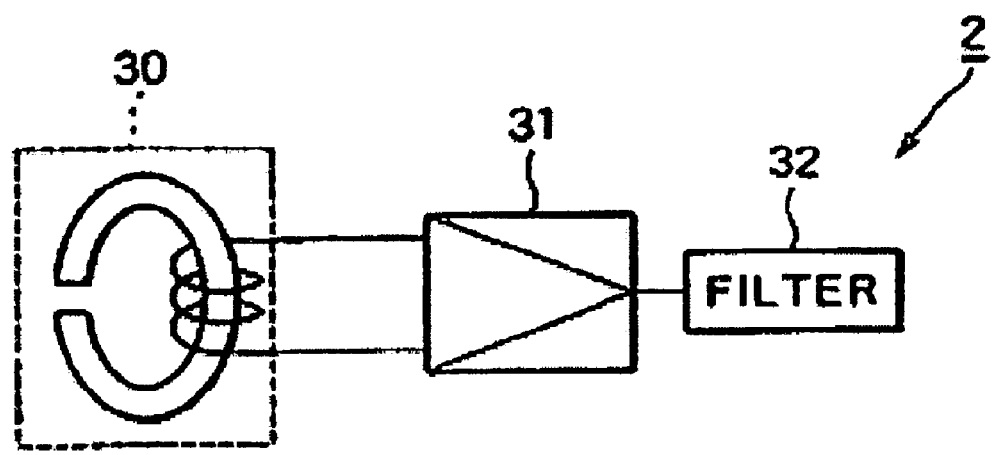
FIG. 7 is a block diagram showing the structure of principal component parts in a conventional magnetic reproducing device according to the related art.

As shown graphically in FIG. 6, the frequency gain characteristic of the FDD with the additional capacitor 22 is such that the high-frequency gain obtained in the vicinity of the innermost portion is lower, approximately by 5 (dB), than the gain obtained in the vicinity of the outermost portion. The inner portion is filtered by a Chebyshev characteristic filter, while the outer portion is filtered by a Butterworth characteristic filter. The frequency-gain characteristics of the FDD with the additional capacitor 22 shown in FIG. 6 represent the overall characteristics of the head amplifier 13 and the filter 14.

Now a description will be given on switching of the filter characteristics and a filtering process. The filter 14 consists of a Chebyshev characteristic filter and a Butterworth characteristic filter. The Chebyshev characteristic filter has features of fast high frequency cut-off and sharp phase change. On the other hand, the Butterworth characteristic filter has features of slow high frequency cut-off and gentle phase change.

When the magnetic head 10 has detected a signal from the inner portion of the disk-shaped magnetic recording medium, the filter 14 is switched to its Chebyshev characteristic filter by the controller 15, and then executes a filtering process. On the other hand, when the magnetic head 10 has detected a signal from the outer portion of the disk-shaped magnetic recording medium, the filter 14 is switched to its Butterworth characteristic filter by the controller 15, and then executes a filtering process.

In the inner portion of the disk-shaped magnetic recording medium, the recording density on the disk is high and the linear velocity is low. In this embodiment, the FDD with the 10 pF additional capacitor 22 for example is such that, as shown graphically in FIG. 4, the impedance becomes higher, approximately by a maximum of 4 dB in a frequency range from 500 kHz to 2 MHz, than the impedance obtained in the other FDD without the additional capacitor 22, and therefore the noise is apt to be picked up. For this reason, in the inner portion of the disk-shaped magnetic recording medium which is weak against the noise and is prone to be affected by the resonance, the Chebyshev characteristic filter is selectively used since it has a more sufficient cut-off effect in a frequency range from 500 kHz to 2 MHz or so as to be compared with the Butterworth characteristic filter. Meanwhile in the outer portion of the disk-shaped magnetic recording medium, the recording density on the disk is low and the linear velocity is high. Therefore, the Butterworth characteristic filter is selectively used for the outer portion of the disk-shaped magnetic recording medium which is strong against the noise and is affected little by the resonance.

The respective values of the coil 20, the additional capacitor 22, the damping resistor 24 and the head resistor 27 are not limited to the above examples alone, and may be some others on condition that the resonance frequency of the resonance circuit consisting of the coil 20, the head resistor 27 and the composite capacitor 26 is within a range of four to eight times the maximum reproduction frequency (250 kHz) of the FDD.

Thus, in the magnetic reproducing device 1 of the structure mentioned above, a capacitor is connected in parallel to a coil of a magnetic head, and the resonance frequency of a resonance circuit consisting of such coil and capacitor is set to be four to eight times the maximum reproduction frequency, hence reducing the high-frequency high-energy electromagnetic noise without increasing the noise around the reproduction frequencies.

The transfer rate may be 1 Mbps as well. The maximum reproduction frequency of the magnetic reproducing device is 500 kHz when the transfer rate is 1 Mbps. In case the coil 20 has an inductance of 175 $\mu$H, the floating capacitor 21 has a capacitance of 3 pF, the damping resistor 24 has a resistance of 20 k$\Omega$ and the head resistor 27 has a resistance of 15 $\Omega$ when the transfer rate is 1 Mbps, then the resonance frequency becomes approximately 6.9 MHz. And if the additional capacitor 22 of 10 pF is connected in parallel to the coil 20, the resonance frequency becomes 3.3 MHz. The respective values of the coil 20, the additional capacitor 22, the damping resistor 24 and the head resistor 27 may be any adequate ones other than the above example on condition that the resonance frequency of the resonance circuit consisting of the coil 20, the head resistor 27 and the composite capacitor 26 is within a range of four to eight times the maximum reproduction frequency (500 kHz) of the FDD.

In the magnetic reproducing device of the present invention, as mentioned above in detail, an additional capacitor is connected in parallel to a coil of a magnetic head, and the resonance frequency of a resonance circuit consisting of such coil, additional capacitor and a floating capacitance is set to be four to eight times the maximum reproduction frequency, thereby realizing a sufficient noise-proof capability in a range from the maximum reproduction frequency to the resonance frequency while minimizing the deterioration of the characteristic in the reproduction frequency band without the necessity of using an electromagnetic noise prevention shield which causes an increase of the device weight and so forth. Moreover, it becomes further possible to attenuate the high-frequency high-energy electromagnetic noise (ranging from ten times the maximum reproduction frequency to several GHz).

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

What is claimed is:

1. A magnetic reproducing device comprising:
   a signal detecting means for detecting a signal from a magnetic recording medium by a coil;
   an amplifying means for amplifying the signal detected by said signal detecting means;
   a filtering means for filtering the signal amplified by said amplifying means; and
   a capacitor connected in parallel to the coil of said signal detecting means;
   wherein the actual resonance frequency of a resonance circuit including said coil, said capacitor and a floating capacitance is set to be four to eight times the maximum reproduction frequency:
   wherein said magnetic recording medium is a 3.5-inch micro floppy disk, and a control means is further provided for selectively switching the filtering characteristic of said filtering means in response to detection of a magnetic signal from the vicinity of the innermost portion of said 3.5-inch micro floppy disk by said detecting means, or in response to detection of a magnetic signal from the vicinity of the outermost portion of said disk; and
   wherein said filtering means is switched to a Chebyshev characteristic filter by said control means when a magnetic signal has been detected from the vicinity of the innermost portion of said 3.5-inch micro floppy disk, and said filtering means is switched to a Butterworth characteristic filter when a magnetic signal has been detected from the vicinity of the outermost portion of said disk.

2. A magnetic memory device for reading and writing data from/to a disk-shaped magnetic recording medium having an inner portion and an outer portion, the magnetic memory device comprising:
   a magnetic head, including a coil, for inductively detecting a signal from the magnetic recording medium;
   an amplifier for amplifying the detected signal;
   a characteristic filter for filtering the amplified signal, said characteristic filter configurable into one of a Chebyshev characteristic filter response configuration and a Butterworth characteristic filter response configuration,
   wherein the configuration of the characteristic filter into one of the two filter response configurations adjusts resonant frequency of the magnetic memory device; and
   a controller operating to configure the characteristic filter into one of the two filter response configurations corresponding to whether the magnetic head is detecting the signal from the inner portion or the outer portion of the disk-shaped magnetic recording medium.

3. The magnetic memory device according to claim 2, wherein the controller configures the characteristic filter into the Chebyshev characteristic filter response configuration when the magnetic head is detecting the signal from the inner portion of the disk-shaped magnetic recording medium.

4. The magnetic memory device according to claim 2, wherein the controller configures the characteristic filter into the Butterworth characteristic filter response configuration when the magnetic head is detecting the signal from the outer portion of the disk-shaped magnetic recording medium.

5. The magnetic memory device according to claim 2, wherein said disk-shaped magnetic recording medium includes a 3.5-inch micro floppy disk.

6. A method of reading data from a disk-shaped magnetic recording medium having an inner portion and an outer portion, the method comprising:
   inductively detecting a signal from the magnetic recording medium within a high-frequency electromagnetic noise environment;
   amplifying the detected signal; and
   filtering the amplified signal by configuring a characteristic filter into one of a Chebyshev characteristic filter response configuration and a Butterworth characteristic filter response configuration corresponding to whether the signal is being detected from the inner portion or the outer portion of the disk-shaped magnetic recording medium.

7. The method according to claim 6, wherein said filtering includes configuring the characteristic filter into the Chebyshev characteristic filter response configuration when the signal is being detected from the inner portion of the disk-shaped magnetic recording medium.

8. The method according to claim 6, wherein said filtering includes configuring the characteristic filter into the Butterworth characteristic filter response configuration when the signal is being detected from the outer portion of the disk-shaped magnetic recording medium.

* * * * *